United States Patent
Yamamoto

(10) Patent No.: US 7,562,023 B2
(45) Date of Patent: Jul. 14, 2009

(54) METHOD AND PROCESSING APPARATUS FOR SETTLING PURCHASE AND PROVIDING INFORMATION ABOUT SUBSEQUENT ACT TO BE PERFORMED

(75) Inventor: Shinichi Yamamoto, Hirakata (JP)

(73) Assignee: Panasonic Corporation, Osaka (JP)

( * ) Notice: Subject to any disclaimer, the term of this patent is extended or adjusted under 35 U.S.C. 154(b) by 1517 days.

(21) Appl. No.: 10/234,819

(22) Filed: Sep. 4, 2002

(65) Prior Publication Data

US 2003/0046119 A1    Mar. 6, 2003

(30) Foreign Application Priority Data

Sep. 5, 2001  (JP) .............. 2001-269392

(51) Int. Cl.
  *G06Q 30/00*  (2006.01)
  *G06Q 10/00*  (2006.01)
(52) U.S. Cl. .................. 705/1; 705/9; 705/26; 705/40
(58) Field of Classification Search .............. 705/1, 705/9, 26, 40
See application file for complete search history.

(56) References Cited

U.S. PATENT DOCUMENTS

| | | | |
|---|---|---|---|
| 5,867,822 A * | 2/1999 | Sankar | 705/8 |
| 5,922,040 A * | 7/1999 | Prabhakaran | 701/117 |
| 6,208,996 B1 * | 3/2001 | Ben-Shachar et al. | 707/104.1 |
| 6,421,650 B1 * | 7/2002 | Goetz et al. | 705/3 |
| 6,925,603 B1 * | 8/2005 | Naito et al. | 715/733 |
| 6,985,869 B1 * | 1/2006 | Stoll et al. | 705/2 |

FOREIGN PATENT DOCUMENTS

| | | |
|---|---|---|
| JP | 11025056 | 1/1999 |
| JP | 2000067126 | 3/2000 |
| JP | 2001076001 | 3/2001 |

OTHER PUBLICATIONS

"Chrono-Bit", NikkeiWinPC, 7th edition, 1st number, Nikkei Business Publications, Japan, Jan. 1, 2001, p. 66, lines 4-9 in the third (right most) column (pertinent lines translated into English).

* cited by examiner

*Primary Examiner*—Naresh Vig
(74) *Attorney, Agent, or Firm*—Snell & Wilmer L.L.P.

(57) ABSTRACT

A method for providing a user of a mobile terminal device with information using the mobile terminal device and a processing apparatus, wherein an action schedule representing an order of a plurality acts to be performed by the user is predetermined, includes the steps of the processing apparatus receiving execution information which specifies one of the plurality of acts from the mobile terminal device; the processing apparatus specifying an act, scheduled to be performed by the user after the act specified by the execution information, as a subsequent act; the processing apparatus acquiring related information relevant to the subsequent act; and the processing apparatus transmitting the related information to the mobile terminal device.

8 Claims, 9 Drawing Sheets

Act schedule

Act 1: Moving by train
Time to take the train 2:30 p.m.
Time to leave the train 3:00 p.m.

Act 2: Seeing a movie
Time to enter the theater 3:30 p.m.
Time to leave the theater 5:30 p.m.

Act 3: Dinner
Time to enter the restaurant 6:00 p.m.
Time to leave the restaurant 7:00 p.m.

Act 4: Moving by train
Time to take the train 7:30 p.m.
Time to leave the train 8:00 p.m.

FIG.5

| Act number | Type of act | Business entity | Location | Scheduled time | |
|---|---|---|---|---|---|
| 1 | Moving by train | AA Railways | Shin Tanabe Station → Kyoto Station | 2:30 p.m. ~3:00 p.m. | Record #1 |
| 2 | Seeing a movie | Kyoto BB Theater | Kyoto BB Theater | 3:30 p.m. ~5:30 p.m. | Record #2 |
| 3 | Dinner | Italian Restaurant CC | Italian Restaurant CC, Kyoto Branch | 6:00 p.m. ~7:00 p.m. | Record #3 |
| 4 | Moving by train | AA Railways | Kyoto Station → Shin Tanabe Station | 7:30 p.m. ~8:00 p.m. | Record #4 |

| Settlement date/time | Business entity | Location | Settlement sum | Content |
|---|---|---|---|---|
| August 31, 2001 14:55 | AA Railways | Kyoto Station | 390 yen | Train fare Shin Tanabe Station–Kyoto Station |

| Date/time of act | Business entity | Location | Settlement sum | Content |
|---|---|---|---|---|
| August 31, 2001 14:55 | AA Railways | Kyoto Station | 390 yen | Train fare Shin Tanabe Station–Kyoto Station |
| August 31, 2001 15:20 | Kyoto BB Theater | Kyoto BB Theater | 1500 yen | Seeing a movie |
| August 31, 2001 18:00 | Italian Restaurant CC | Italian Restaurant CC, Kyoto Branch | 2000 yen | Dinner |
| August 31, 2001 19:55 | AA Railways | Shin Tanabe Station | 390 yen | Train fare Kyoto Station–Shin Tanabe Station |

801

811

METHOD AND PROCESSING APPARATUS FOR SETTLING PURCHASE AND PROVIDING INFORMATION ABOUT SUBSEQUENT ACT TO BE PERFORMED

BACKGROUND OF THE INVENTION

1. Field of the Invention

The present invention relates to a method and a processing apparatus for providing information to a user performing an act in compliance with an action schedule.

2. Description of the Related Art

One conventionally known system for providing information to a user performing an act in compliance with an action schedule is based on the technology disclosed in International Publication WO96/17315. According to this conventional technology, a schedule for a user visiting a plurality of locations is automatically prepared. The above-mentioned publication also discloses a system for guiding a vehicle driven by the user in compliance with the schedule.

According to this conventional technology, the vehicle driven by the user and the predetermined schedule are compared with each other based on information representing the position of the vehicle. This conventional technology has a premise that the user moves, and does not consider providing information at an appropriate timing in accordance with the act of the user regardless of whether or not the user moves from one location to another while the user acts in compliance with the schedule.

SUMMARY OF THE INVENTION

According to one aspect of the invention, a method for providing a user of a mobile terminal device with information using the mobile terminal device and a processing apparatus is provided. An action schedule representing an order of a plurality acts to be performed by the user is predetermined. The method includes the steps of the processing apparatus receiving execution information which specifies one of the plurality of acts from the mobile terminal device; the processing apparatus specifying an act, scheduled to be performed by the user after the act specified by the execution information, as a subsequent act; the processing apparatus acquiring related information relevant to the subsequent act; and the processing apparatus transmitting the related information to the mobile terminal device.

In one embodiment of the invention, the execution information is information regarding a settlement of a purchase and sale transaction accompanied by the act specified by the execution information.

In one embodiment of the invention, the related information includes at least one of information regarding a map of an area including a location where the user is scheduled to perform the subsequent act, information representing a crowdedness of the location, information regarding a list of services available to the user in a commercial establishment where the user is scheduled to perform the subsequent act, and information regarding business hours of the commercial establishment.

In one embodiment of the invention, the plurality of acts include at least one of moving by train, seeing a movie, having dinner at a restaurant, entering an amusement park, and entering an attraction in the amusement park.

In one embodiment of the invention, the processing apparatus includes a storage section for storing the action schedule.

In one embodiment of the invention, the method further includes the step of the processing apparatus creating an action record of the user based on the execution information.

In one embodiment of the invention, the method further includes the step of the processing apparatus creating a payment record accompanying the acts of the user based on the information regarding the settlement of the purchase and sale transaction.

In one embodiment of the invention, the method further includes the step of the processing apparatus creating an action record including a payment record accompanying the acts of the user based on the information regarding the settlement of the purchase and sale transaction.

According to another aspect of the invention, a processing apparatus connected to a mobile terminal device via a network includes a storage section for storing an action schedule representing an order of a plurality acts to be performed by a user of the mobile terminal device; a network communication section for communicating with the mobile terminal device via the network; and a processing section. The network communication section receives execution information which specifies one of the plurality of acts from the mobile terminal device. The processing section specifies an act, scheduled to be performed by the user after the act specified by the execution information, as a subsequent act, and acquires related information relevant to the subsequent act. The network communication section transmits the related information to the mobile terminal device.

In one embodiment of the invention, the execution information is information regarding a settlement of a purchase and sale transaction accompanied by the act specified by the execution information.

Thus, the invention described herein makes possible the advantages of providing a method and a processing apparatus capable of providing information at an appropriate timing in accordance with the act of the user.

These and other advantages of the present invention will become apparent to those skilled in the art upon reading and understanding the following detailed description with reference to the accompanying figures.

BRIEF DESCRIPTION OF THE DRAWINGS

FIG. 5 shows an exemplary structure of data 510 representing an action schedule stored in a storage section 5 of the service center 1;

FIG. 6A shows an exemplary structure of data representing settlement information 121 shown in FIG. 1;

FIG. 6B shows an exemplary structure of data representing an action record;

DESCRIPTION OF THE PREFERRED EMBODIMENTS

Hereinafter, the present invention will be described by way of illustrative examples with reference to the accompanying drawings.

Figure 1:
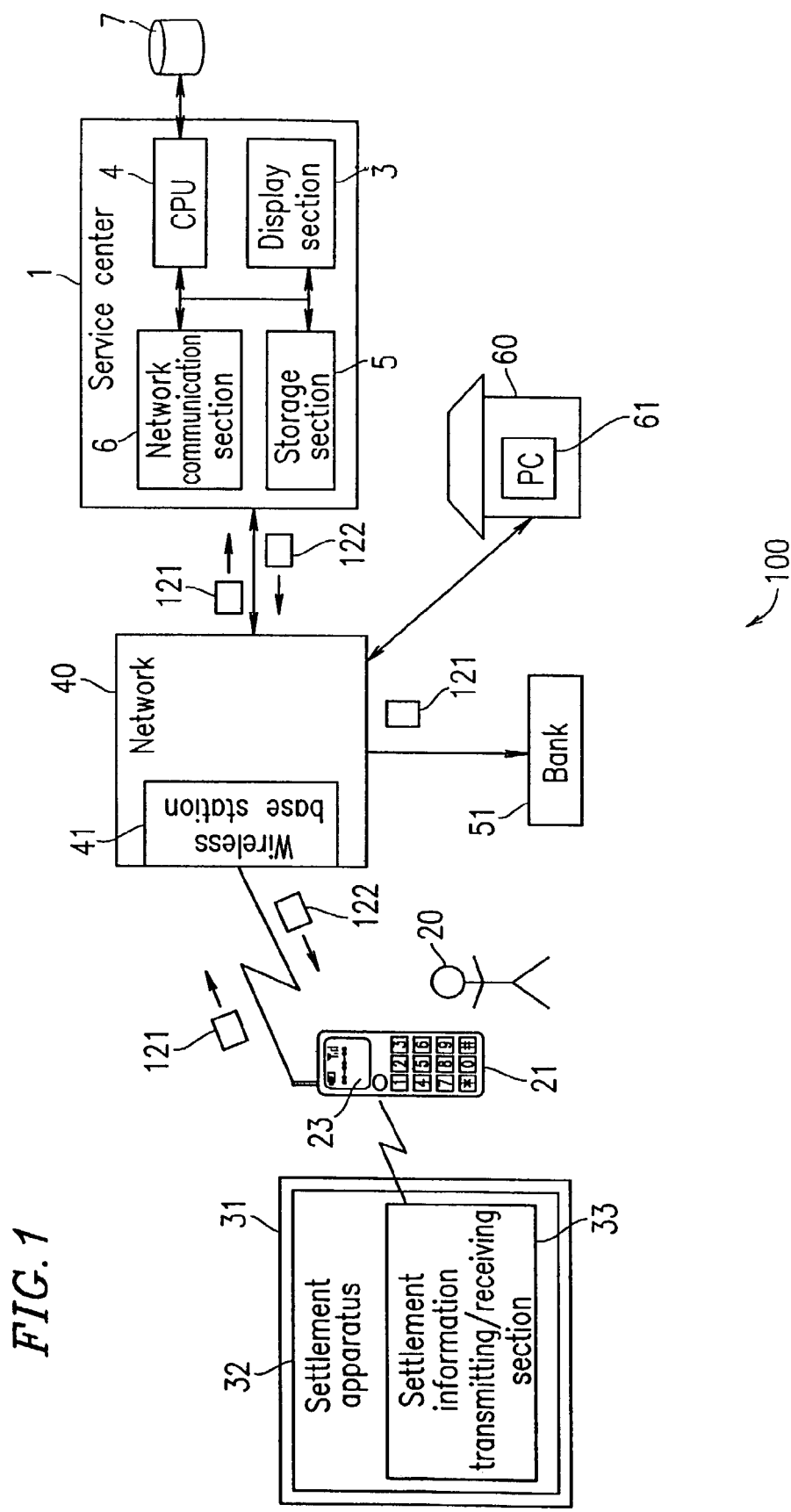
FIG. 1 shows an overall structure of an action schedule support service system 100 according to an example of the present invention.

FIG. 1 shows an overall structure of an action schedule support service system 100 according to an example of the present invention. The action schedule support service system 100 includes a service center 1 and a mobile terminal device 21. The service center 1 and the mobile terminal device 21 are connected to each other via a network 40. The network 40 includes a wireless base station 41. The network 40 and the mobile terminal device 21 are wirelessly connected to each other by communication between the wireless base station 41 and the mobile terminal device 21. In FIG. 1, reference numeral 20 represents a user of the mobile terminal device 21. The network 40 is also connected to a bank 51 with which the user 20 performs transactions (i.e., with which the user 20 has an account) and to a personal computer (PC) 61 in a house 60 of the user 20.

The mobile terminal device 21 has a settlement function. The settlement function may be a function of communicating with a settlement information receiving section 33 in a settlement apparatus 32 provided in a commercial establishment 31 so as to cashlessly perform a settlement of a purchase and sale transaction done by the user 20 of the mobile terminal device 21 in the commercial establishment 31. The mobile terminal device 21 may be, for example, a cellular phone.

The network 40 may include various types of LANs including wireless LANs, WANs, telephone lines and the like. The network 40 may include the Internet. In the case where the mobile terminal device 21 is a cellular phone, the network 40 includes a wireless telephone line for providing communication service to the cellular phone.

When acting in compliance with the action schedule, the user 20 performs a purchase and sale transaction in the commercial establishment 31. FIG. 1 shows one commercial establishment 31, but the number of commercial establishments 31 in which the user 20 performs a purchase and sale transaction when acting in compliance with the action schedule may be any number of two or more. The user 20 may perform a purchase and sale translation with any number of commercial establishments 31 when acting in compliance with the action schedule. The purchase and sale transaction is not limited to purchase and sale of products, but may include purchase and sale of any service. The commercial establishment 31 may be, for example, a movie theater, amusement park, restaurant, or train station. The settlement apparatus 32 may be, for example, a ticket selling machine at a movie theater or an amusement park, a cash register at a restaurant, or an automatic ticket checking machine at a train station.

The service center 1 includes a network communication section 6 for communicating with the mobile terminal device 21 via the network 40, a CPU (processing section) 4, a storage section 5, and a display section 3. The service center 1 may be any processing apparatus, and may be, for example, a server computer. The storage section 5 may be a hard disk or any memory. The display section 3 may be any display device for monitoring the state of the service center 1. The service center 1 is capable of accessing a database 7.

The action schedule support service system 100 provides information to the user 20 acting in compliance with the action schedule at an appropriate timing, thus providing service which supports the user 20 to act in compliance with the action schedule (action schedule support service).

Hereinafter, the procedure (steps 1 through 3) by which the user 20 uses the action schedule support service will be described.

1. Register an Action Schedule with the Service Center 1

The user 20 registers an action schedule before acting in compliance with the action schedule (for example, before leaving home). The registration may be done by, for example, the PC 61 in the house 60 of the user 20 accessing the service center 1. The registered action schedule is stored in the storage section 5. A specific example of the action schedule will be described later with reference to FIG. 3.

2. Act in Compliance with the Action Schedule

The user 20 then acts in compliance with the action schedule (for example, goes out) while carrying the mobile terminal device 21.

3. Perform a Settlement Using the Mobile Terminal Device 21

While acting in compliance with the action schedule, the user 20 performs a settlement of a purchase and sale transaction in the commercial establishment 31 using the mobile terminal device 21. The mobile terminal device 21 transmits information regarding the purchase and sale transaction (settlement information 121) to the bank 51, with which the user 20 performs transactions, via the network 40. Based on the settlement information 121, the bank 51 transfers the sum of money charged for the purchase and sale transaction from the account of the user 20 to the commercial establishment 31. Thus, the user 20 can cashlessly perform a settlement of the purchase and sale transaction done by the user 20 in the commercial establishment 31. Such a manner of settlement of a purchase and sale transaction using the mobile terminal device 21 is expected to become popular in the future. The mechanism of settlement is not limited to the form shown in FIG. 1.

The bank 51 may be used for charging the user 20 the price for using the action schedule support service provided by the service center 1. In the case where the mobile terminal device 21 is a cellular phone, the price for using the action schedule support service provided by the service center 1 may be charged together with the price for the communication service using the cellular phone.

The settlement information 121 is also transmitted to the service center 1. The service center 1 compares the settlement information 121 with the action schedule stored in the storage section 5, so as to specify an action scheduled to be performed next by the user 20 (next act) and transmits the information regarding the next act (related information 122) to the mobile terminal device 21. The related information 122 may be acquired by the service center 1 accessing the database 7. The related information 122 is displayed on a display screen 23 of the mobile terminal device 21.

Thus, the user 20 can obtain the information regarding the next act which is scheduled to be performed next by the user 20 at an appropriate timing.

Figure 2:
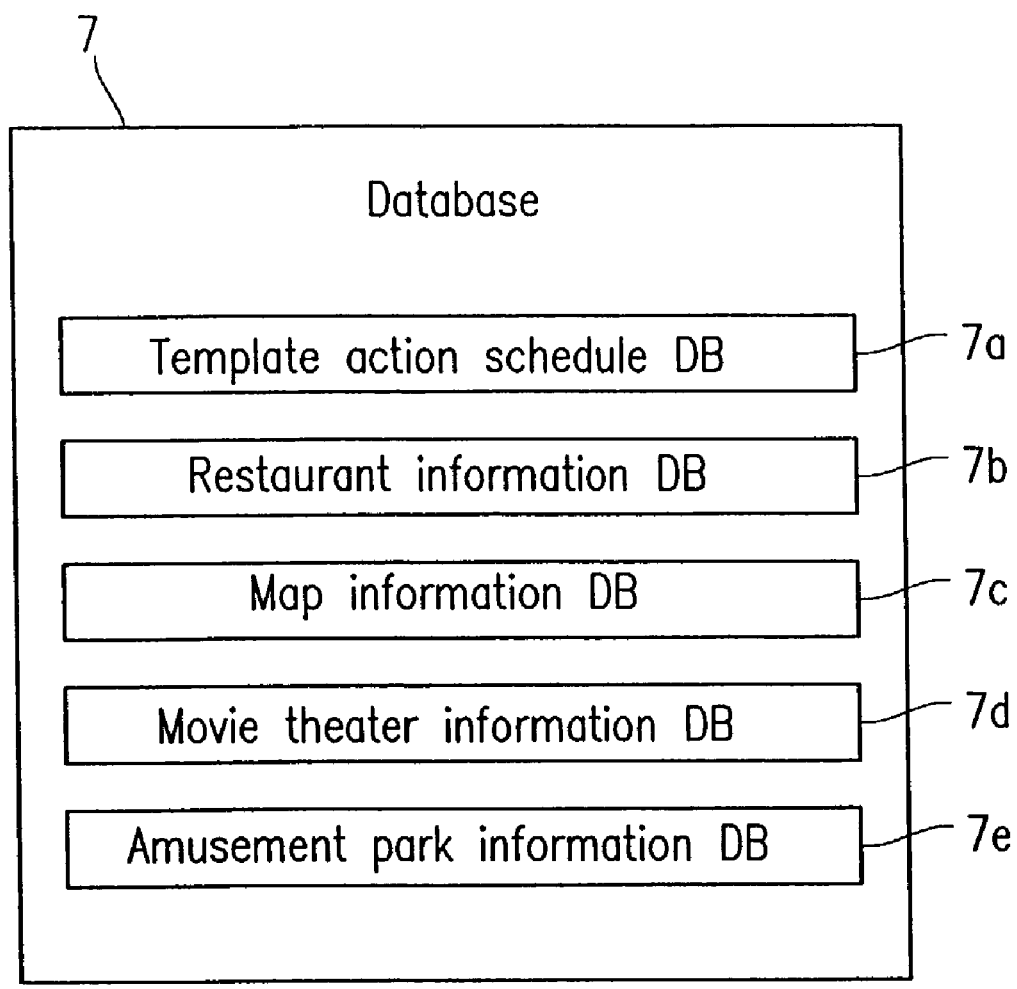
FIG. 2 shows an exemplary structure of a database 7 of the action schedule support service system 100.

FIG. 2 shows an exemplary structure of the database 7. The database 7 includes a template action schedule database (DB) 7a, a restaurant information database 7b, a map information database 7c, a movie theater information database 7d, and an amusement park information database 7e.

The template action schedule database 7a includes templates of the action schedule (template action schedules) provided by the provider of the action schedule support service (for example, the administrator of the service center 1). Such a template action schedule may be, for example, an action schedule for visiting famous tourist spots in the city of Kyoto, Japan within a day in accordance with a predetermined course. The action schedule may be an action schedule for a day trip or an action schedule for a longer trip.

In step 1 of the procedure of using the action schedule support service described above with reference to FIG. 1, the user 20 may select a desired template action schedule or alter a template action schedule into a desired action schedule, so as to determine an action schedule of a form reflecting the desires of the user 20. The user 20 may create a desired action schedule irrespective of the template action schedules.

The restaurant information database 7b, the map information database 7c, the movie theater information database 7d and the amusement park information database 7e are accessed by the service center 1 in step 3 of the procedure of using the action schedule support service described above with reference to FIG. 1. The databases 7b through 7e are accessed in accordance with the type of the commercial establishment 31 in which the user 20 will perform the next act (for example, whether the user 20 will perform the next act in the "movie theater" or the "amusement park").

The restaurant information database 7b includes restaurant information (for example, information on menus of restaurants, and business hours of each of the restaurants) The restaurant information database 7b may be accessed by the service center 1 in the case where the next act of the user 20 is "meal at a restaurant" (for example, dinner).

The map information database 7c includes map information (for example, information on a map of an area including the commercial establishment 31). The map information database 7c may be accessed by the service center 1 irrespective of the next act of the user 20.

The movie theater information database 7d includes movie theater information (for example, titles of movies shown in movie theaters, and business hours of each of the movie theaters). The movie theater information database 7d may be accessed by the service center 1 in the case where the next act of the user 20 is "seeing a movie".

The amusement park information database 7e includes amusement park information (for example, types of attractions in amusement parks, and business hours of each of the amusement parks). The amusement park information database 7e may be accessed by the service center 1 in the case where the next act of the user 20 is "entering an amusement park".

Figure 3:
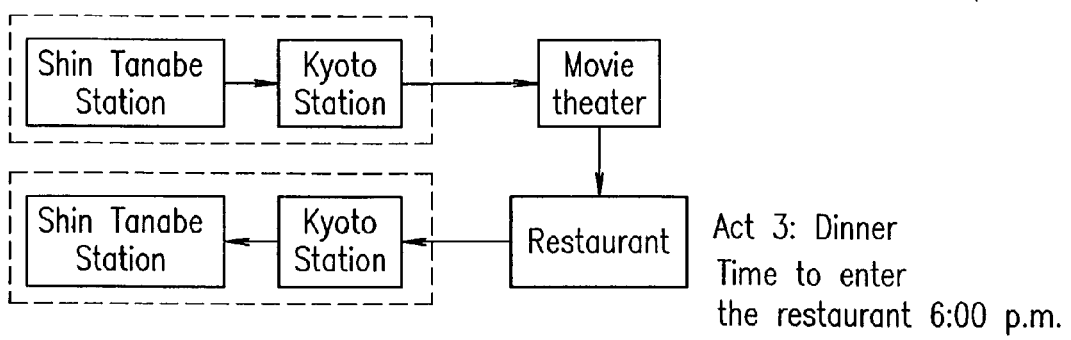
FIG. 3 shows an exemplary action schedule.

FIG. 3 shows an exemplary action schedule.

The action schedule indicates the order of a plurality of acts scheduled to be performed by the user 20. The action schedule shown in FIG. 3 indicates that act 1 (moving by train), act 2 (seeing a movie), act 3 (dinner) and act 4 (moving by train) are scheduled to be performed in this order. The action schedule shown in FIG. 3 is an exemplary action schedule of going out and returning home in one day.

In the following description, unless otherwise specified, the user 20 performs each of the plurality of acts in one commercial establishment, respectively, and performance of each of the plurality of acts accompanies a purchase and sale transaction with the commercial establishment. The expression "during an act" means the time during which the user 20 is using the commercial establishment (for example, when the type of act is "meal at a restaurant", the term "during an act" means the time from when the user 20 enters the restaurant until the user 20 exits the restaurant).

Figure 4:
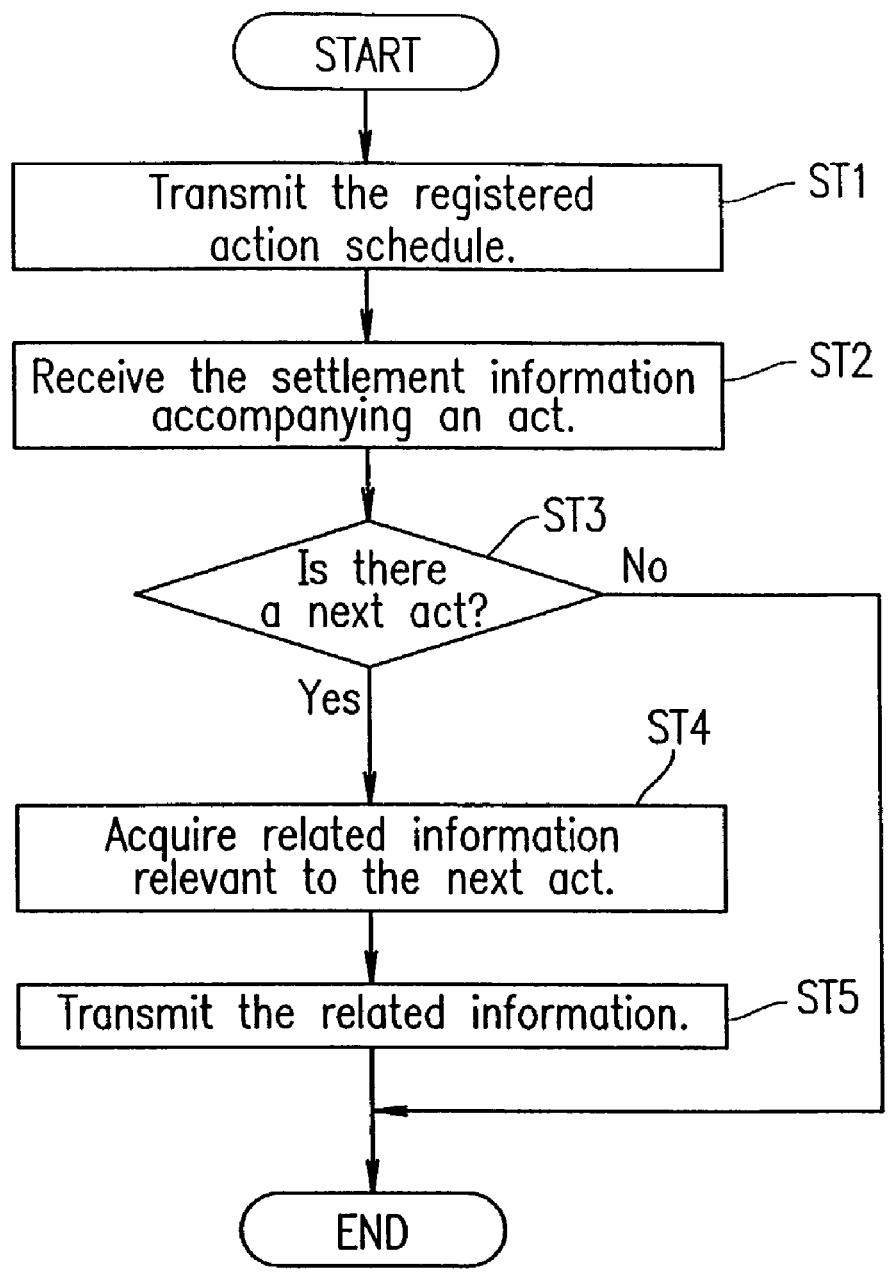
FIG. 4 is a flowchart illustrating a procedure of processing executed by a service center 1 for providing information to a user 20 acting in compliance with an action schedule (information provision processing)

FIG. 4 shows a procedure of processing executed by the service center 1 (FIG. 1) for providing information to the user 20 acting in compliance with the action schedule (information provision processing). The information provision processing is executed by, for example, the CPU 4 (FIG. 1) in the service center 1 executing a predetermined program after the user 20 registers the action schedule with the service center 1 in step 1 of the procedure of using the action schedule support service described above with reference to FIG. 1. By the time when the information provision processing is performed, the order of the plurality of acts scheduled to be performed by the user 20 has been predetermined by the registered action schedule.

Step ST1: The network communication section 6 (FIG. 1) transmits the action schedule stored in the storage section 5 to the mobile terminal device 21. Thus, the action schedule is displayed on the mobile terminal device 21. Such display of the action schedule is convenient for the user 20 to confirm the action schedule. Step ST1 may be omitted.

Step ST2: The network communication section 6 receives the settlement information 121 regarding the settlement of a purchase and sale transaction accompanying the act performed by the user 20. The user 20 performs a settlement of the purchase and sale transaction using the mobile terminal device 21 in the commercial establishment 31 in which the act is performed (while using the commercial establishment 31).

Step ST3: The CPU 4 determines whether or not there is an action scheduled to be performed by the user 20 next to the act accompanied by the purchase and sale transaction for which the settlement has been done by the user 20 (next act).

When the determination result of step ST3 is "yes", the processing advances to step ST4. In this case, step ST3 functions as a step for specifying the act, scheduled to be performed by the user 20 next to the act represented by the settlement information 121, as a next act.

When the determination result of step ST3 is "no", the processing is terminated.

Step ST4: The CPU 4 acquires the related information 122 (FIG. 1) regarding the next act. The acquisition may be performed by the CPU 4 accessing the database 7.

Step ST5: The network communication section 6 transmits the related information 122 to the mobile terminal device 21.

It is not necessary that the network communication section 6 receive the settlement information 121 (execution information) regarding all the acts performed by the user 20 in step ST2. For example, when an act of the user 20 is not accompanied by a purchase and sale transaction (for example, walking in a park), the mobile terminal device 21 does not transmit the settlement information 121. Nor does the service center 1 receive the settlement information 121 from the mobile terminal device 21. In a system in which the user 20 transmits the execution information to the service center 1 by manually triggering the mobile terminal device 21 (for example, by pushing one or more of the numerical keys of "1" through "9" and a function key), when the user 20 forgets to trigger the mobile terminal device 21, the mobile terminal device 21 does not transmit the execution information. Nor does the service center 1 receive the execution information 121 from the mobile terminal device 21.

Even if the user 20 does not transmit execution information of every one of the acts of the user 20 to the service center 1, that does not hinder the processing of the service center 1. The reason is that the service center 1 can refer to the execution information transmitted from the mobile terminal device 21 so as to determine which act included in the action schedule should be compared with the execution information. Alternatively, the mobile terminal device 21 may be structured so that when the user 20 manually triggers the mobile terminal device 21, necessary information can be input to the mobile terminal device 21 together with an act number. In this case, the service center 1 can refer to the act number transmitted from the mobile terminal device 21 so as to determine which act included in the action schedule should be compared with the act number.

In step ST3, the CPU 4 may determine whether or not there is an action scheduled to be performed by the user 20 after the act accompanied by the purchase and sale transaction for which the settlement has been done by the user 20 (subsequent act). The subsequent act may be an action scheduled to be performed by the user 20 next to the act accompanied by the purchase and sale transaction for which the settlement has been done by the user 20, an action scheduled to be performed by the user 20 next, next to the act accompanied by the purchase and sale transaction for which the settlement has been done by the user 20 (next, next act), or an act after the next, next act. In this case, step ST3 functions as a step for specifying the act, scheduled to be performed by the user 20 after the act represented by the settlement information 121 (execution information), as a subsequent act. In step ST4, the related information 122 (FIG. 1) relevant to the subsequent act is acquired; and in step ST5, the related information 122 is transmitted to the mobile terminal device 21.

In the case where there is no useful information that the user 20 should acquire as related information relevant to the next act, for example, in the case where the next act of the user 20 is "walking in the park in the user's neighborhood which is familiar to the user 20", it is omitted to acquire the related information 122 relevant to the next act and transmit the related information 122 to the mobile terminal device 21. In this case, instead of acquiring the related information 122 relevant to the next act, related information 122 relevant to the next, next act (or an act after the next, next act) may be acquired and transmitted to the mobile terminal device 21.

FIG. 5 shows an exemplary structure of data 510 representing an action schedule stored in the storage section 5 of the service center 1. The data 510 represents an action schedule shown in FIG. 3.

The data 510 includes four records #1 through #4. The four records #1 through #4 respectively correspond to acts 1 through 4 shown in FIG. 3. Each of the four records #1 through #4 includes an "act number" field 511, a type of act" field 512, a "business entity" field 513, a "location" field 514, and a "scheduled time" field 515.

The "act number" field 511 includes a numeral representing the turn of the respective act in the order of the plurality of acts scheduled to be performed by the user 20. The "type of act" field 512 includes the type of the act. The "business entity" field 513 includes the name of the business entity which administers the commercial establishment in which the act is performed. The "location" field 514 includes a location where the act is performed. The "scheduled time" field 515 includes the time at which the user 20 is scheduled to perform (starting time and termination time).

For an act performed in a plurality of locations, the "location" field 514 includes the plurality of locations. For example, record #1 and record #4 each include, in the "location" field 514, the station where user 20 is scheduled to take the train (left to the arrow) and the station where user 20 is scheduled to leave the train (right to the arrow).

FIG. 6A shows an exemplary structure of data representing the settlement information 121 shown in FIG. 1. The settlement information 121 shown in FIG. 6A is transmitted from the mobile terminal device 21 to the service center 1 (FIG. 1) and to the bank 51 when the user 20 performs act 1 (moving by train) of the action schedule shown in FIG. 3.

The settlement information 121 includes a "settlement date/time" field 611, a "business entity" field 612, a "location" field 613, a "settlement sum" field 614, and a "content" field 615.

The settlement information 121 is information regarding a transaction (purchase and sale transaction) in which the user 20 pays a train fare of 390 yen to the business entity "AA Railways" as a price for receiving transportation service from the train station where the user 20 takes the train (Shin Tanabe Station) to the train station where the user 20 leaves the train (Kyoto Station).

The settlement information 121 is generated in the mobile terminal device 21 as described below.

When the user 20 performs act 1 (moving by train) of the action schedule shown in FIG. 3, the user 20 passes through the automatic ticket checking machine of the train station where the user 20 takes the train (Shin Tanabe Station). At this point, the settlement information receiving section 33 (FIG. 1) of the automatic ticket checking machine writes information, indicating that the user 20 takes the train from Shin Tanabe Station, to the mobile terminal device 21 via wireless communication. When the user 20 passes through the automatic ticket checking machine (the settlement apparatus 32) of the train station where the user 20 leaves the train (Kyoto Station), the settlement information receiving section 33 of the automatic ticket checking machine and the mobile terminal device 21 perform wireless communication therebetween. The settlement information receiving section 33 reads the information written in the mobile terminal device 21 at the station where the user 20 took the train, so as to learn that the user 20 was in the train from Shin Tanabe Station to Kyoto Station. Then, the settlement information receiving section 33 searches for the train fare from Shin Tanabe Station to Kyoto Station based on a predetermined table, and transmits information indicating the obtained train fare (390 yen) to the mobile terminal device 21. Based on this information, the mobile terminal device 21 generates settlement information 121. In the "settlement date/time" field 611 of the settlement information 121, the date and time when the settlement is performed (in this example, the time at which the user 20 passes through the automatic ticket checking machine of the train station where the user 20 left the train) is stored.

The settlement information 121 is transmitted to the bank 51 via the network 40 in order to transfer money from the account of the user 20 to the business entity "AA Railways" and is also transmitted to the service center 1 via the network 40 as execution information which specifies one of the plurality of acts included in the action schedule.

The same information may be transmitted to two different locations by as above, for example, specifying an address of the service center 1 and the address of the bank 51 in the header of a data packet carrying the settlement information 121 as addressees of the packet.

Generation and transmission of the settlement information 121 by the mobile terminal device 21 may be automatically performed by a program incorporated in the mobile terminal device 21. Alternatively, the transmission of the settlement information 121 from the mobile terminal device 21 to the service center 1 may be performed in response to the user 20 manually triggering the mobile terminal device 21 (for example, pushing a predetermined button provided in the mobile terminal device 21).

The settlement information 121 represents a settlement of a purchase and sale transaction accompanying an act of the user 20. Accordingly, when such a settlement is performed before an act (so-called advance payment), the settlement information 121 represents an act that the user 20 is about to perform. Similarly, when a settlement is performed after an act (so-called later payment), the settlement information 121 represents an act that the user 20 has recently finished. When a settlement is performed while an act is being performed, the settlement information 121 represents an act that the user 20 is currently performing. In this manner, the settlement information 121 specifies one of the plurality of acts included in the action schedule (an act accompanied by a purchase and sale transaction for which a settlement has been done).

An act of "moving by train" for which a settlement is performed when the user 20 passes through the automatic ticket checking machine of the station where the user 20 left the train is an example of "later payment". An act of "meal at a restaurant" for which a settlement is performed after the meal is also an example of "later payment". An act of "meal at a restaurant" for which a food ticket is purchased before the meal is an example of "advance payment". The timing of a purchase and sale transaction (for example, advance payment or later payment) is predetermined by each business entity.

The settlement information 121 is received by the service center 1 in step ST2 (FIG. 4) of information provision processing. The service center 1 can compare the action schedule 510 (FIG. 5) stored in the storage section 5 with the settlement information 121 (FIG. 6A) so as to specify the act accompanied by a purchase and sale transaction for which user 20 performed a settlement. This comparison may be performed by, for example, comparing the "business entity" field 513 and the "location" field 514 of a specific record of the action schedule 510 with the "business entity" field 612 and the "location" field 613 of the settlement information 121, respectively. When the "business entity" field 513 of the specific record of the action schedule 510 matches the "business entity" field 612 of the settlement information 121 and the "location" field 514 of the specific record of the action schedule 510 matches the "location" field 613 of the settlement information 121, an act corresponding to the specific record is specified as an act accompanied by a purchase and sale transaction for which the user 20 performed a settlement. In the case where the record includes a plurality of locations in the "location" field 514, one of the locations at which the settlement is performed is compared with the content of the "location" field 613 of the settlement information 121. For example, record #1 and record #4 (FIG. 5) each include two train stations, i.e., the train station where the user 20 takes the train and the train station where the user 20 leaves the train in the "location" field 514. At which one of the plurality of locations the settlement is performed is defined with reference to the predetermined timing of settlement which is predetermined for the corresponding business entity. When the manner of the settlement of the business entity "AA Railways" is later payment, the settlement is performed at the train station where the user 20 left the train. Accordingly, the train station where the user 20 left the train is compared with the content of the "location" field 613 of the settlement information 121.

In order to specify an act accompanied by a purchase and sale transaction for which the user 20 performed a settlement, the "scheduled time" field 515 of a specific record of the action schedule 510 may be compared with the "settlement date/time" field 611 of the settlement information 121. This comparison is not indispensable. Alternatively, the "settlement date/time" field 611 of the settlement information 121 may be replaced with the time at which the mobile terminal device 21 transmitted the settlement information 121 or the time at which the service center 1 received the settlement information 121.

The act indicated by the settlement information 121 shown in FIG. 6A is specified as corresponding to record #1 having act number 1.

As described above, according to this example of the present invention, an act of the user 20 is compared with a prescribed action schedule based on the settlement information 121. In this manner, a plurality of acts performed by the user 20 can be distinguished from each other even in the case where the plurality of acts are performed at the same location or locations which are very close to each other. For example, even in the case that the location where the user 20 "sees a movie" and the location where the user 20 has "dinner" are respectively on the third floor and the second floor of the same building, these acts can be distinguished from each other by the comparison based on the settlement information 121.

Determination whether or not there is an action scheduled to be performed by the user 20 next to the act represented by the settlement information 121 (step ST3 in FIG. 4) may be executed by determining whether or not the action schedule 510 (FIG. 5) includes a record having an act number which is larger by one than the act number of the act represented by the settlement information 121. When the action schedule 510 includes such a record, the act corresponding to the record (in this example, record #2 in FIG. 5) is specified as the next act.

The service center 1 refers to the "location" field 514 (FIG. 5) of record #2 so as to learn that the location where the user 20 performs the next act is the "Kyoto BB Theater". Thus, the service center 1 accesses the map information database 7c (FIG. 2) in step ST4 of the information provision processing (FIG. 4) so as to acquire information regarding the map of an area including "Kyoto BB Theater" (map information) as the related information 122 relevant to the next act.

Figure 7:
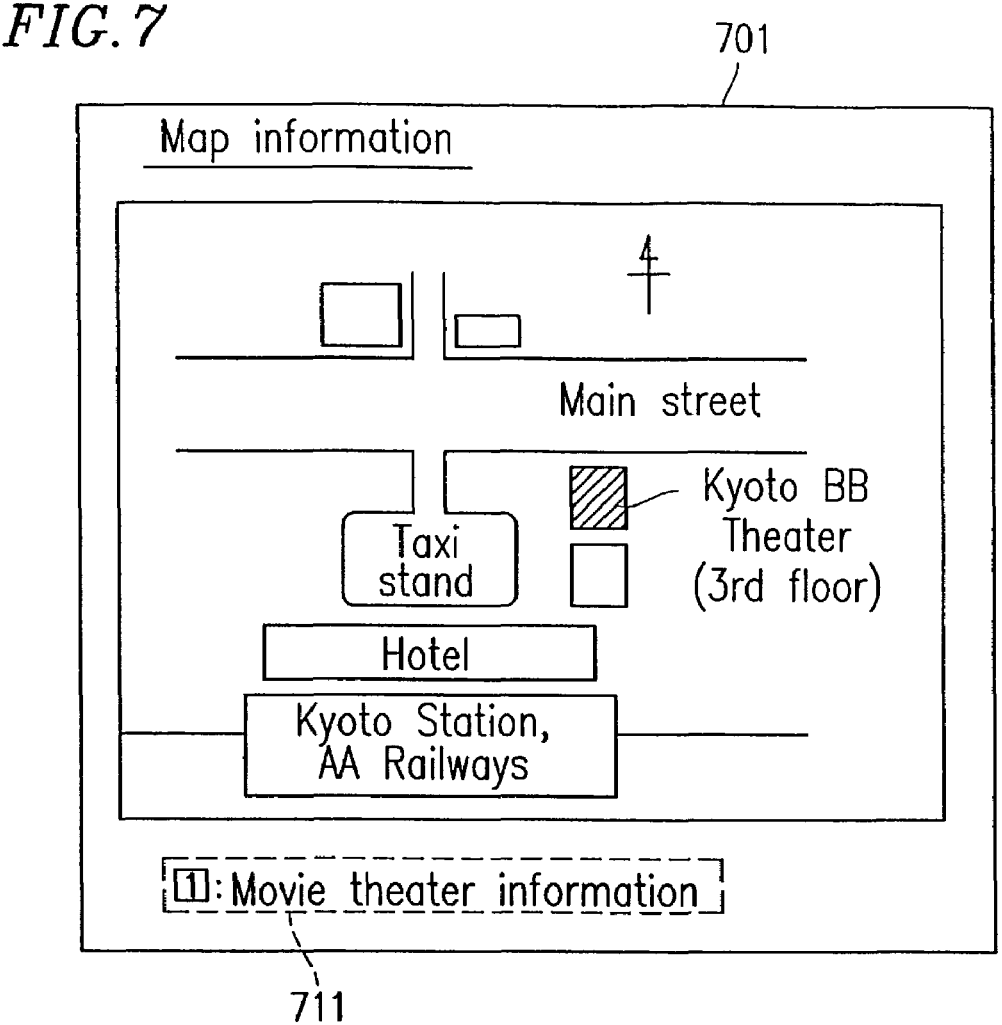
FIG. 7 shows a screen 701 illustrating a map of an area including a location where a next act is scheduled to be performed.

FIG. 7 shows a screen 701 illustrating the map of an area including the location where the next act is performed. The screen 701 is displayed on the display screen 23 (FIG. 1) of the mobile terminal device 21 by the mobile terminal device 21 receiving the related information 122. The map of an area including the movie theater to which the user 20 is about to go, i.e., "Kyoto BB Theater", is displayed on the mobile terminal device 21, so that information is provided to the user 20 at an appropriate timing in accordance with the act of the user 20. The related information 122 (in this example, information regarding the map of an area including the location where the user 20 is scheduled to perform the next act, i.e., "Kyoto BB Theater") is preferably received by the mobile terminal device 21 without being accompanied by any explicit transmission request by the user 20; i.e., is preferably "pushed" to the mobile terminal device 21. In this manner, the user 20 is released from the trouble of searching for information regarding the next act and requesting transmission of the information.

The user 20 can rely on the screen 701 displayed on the display screen 23 of the mobile terminal device 21 so as to easily reach the location where the user 20 performs the next act (seeing a movie), i.e., "Kyoto BB Theater".

The service center 1 may compare the "scheduled time" field 515 of the record corresponding to the act, among the acts included in the action schedule 510 (FIG. 5), which is specified by the settlement information 121 (the act accompanied by a purchase and sale transaction for which the user 20 performed a settlement) with the "settlement date/time" field 611 of the settlement information 121 (FIG. 6A). In this way, the service center 1 may determine whether or not the act is delayed with respect to the action schedule 510. When the act is delayed with respect to the action schedule 510, a message for urging the user 20 to move to the location where the user 20 is to perform the next act may be displayed on the display screen 23 of the mobile terminal device 21. For determining whether or not the act is delayed with respect to the action schedule 510, the timing of the settlement of the purchase and sale transaction accompanying the act (for example, advanced payment or later payment) may be referred to.

The related information 122 is not limited to map information of an area including the location where the user 20 is to perform the next act (in this example, "Kyoto BB Theater"). The related information 122 may be movie theater information (the title of the movie shown in the "Kyoto BB Theater", business hours of the "Kyoto BB Theater", etc.). In the case where the action schedule 510 includes the title of the movie that the user 20 is scheduled to see, the movie information may include the time schedule of the movie. The movie theater information is, for example, "pushed" to the mobile terminal device 21 together with the above-described map information, so that the movie theater information may be displayed on the mobile terminal device 21 by the user 20 pushing button "1" (see FIG. 1; not shown in FIG. 7) provided in the mobile terminal device 21 in accordance with an instruction of an area 711 (FIG. 7). Alternatively, the mobile terminal device 21 may request the service center 1 to transmit the movie theater information in response to the button "1" of the mobile terminal device 1 being pushed (namely, the mobile terminal device 21 may "pull" the movie theater information from the service center 1). The service center 1 may acquire the movie theater information by accessing the movie theater information database 7d.

The related information 122 can be considered as appropriate advice regarding the next act. The related information 122 may be information regarding a list of services available to the user 20 (for example, a menu of dishes) in the commercial establishment in which the user 20 is scheduled to perform the next act (for example, a restaurant).

Figure 8A:
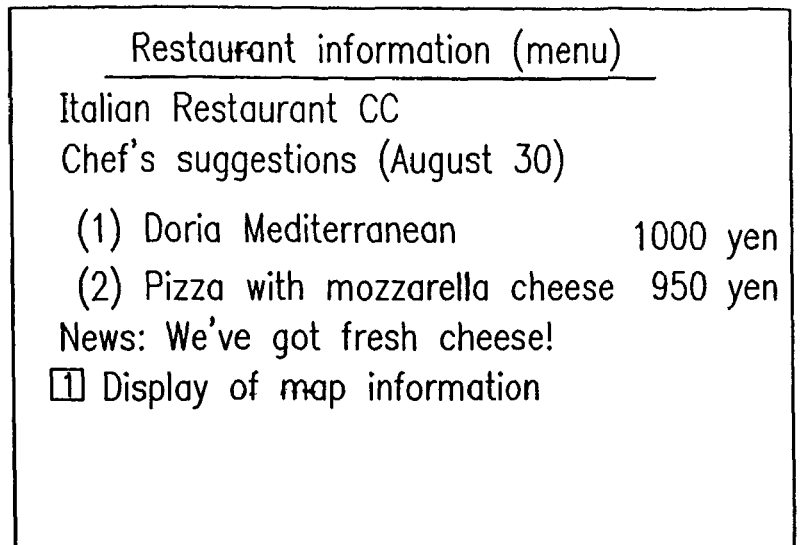
FIG. 8A shows a screen 801 illustrating a menu of a restaurant where the next act is scheduled to be performed.

FIG. 8A shows a screen 801 illustrating a menu of a restaurant where the user 20 is to perform the next act. The screen 801 is displayed on the display screen 23 (FIG. 1) of the mobile terminal device 21 by the mobile terminal device 21 receiving the related information 122 when the related information 122 is the menu of dishes of the restaurant where the user 20 is scheduled to perform the next act. One advantage of providing the user 20 with the menu of the restaurant in this manner is that the latest information (for example, today's special) can be provided to the user 20.

The related information 122 may represent the crowdedness of the location where the user 20 is scheduled to perform the next act.

Figure 8B:
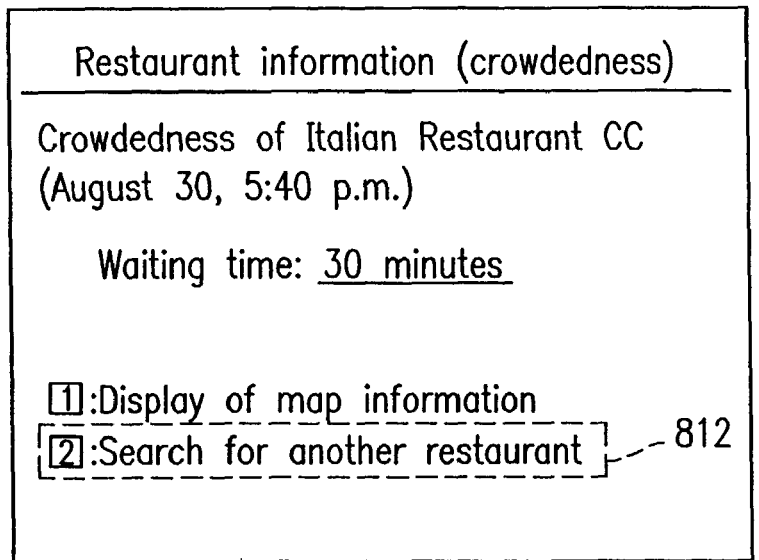
FIG. 8B shows a screen 811 illustrating the crowdedness of the restaurant where the next act is scheduled to be performed.

FIG. 8B shows a screen 811 illustrating the crowdedness of the restaurant where the user 20 is to perform the next act. The screen 811 is displayed on the display screen 23 of the mobile terminal device 21 (FIG. 1) by the mobile terminal device 21 receiving the related information 122 when the related information 122 is the crowdedness of the restaurant where the user 20 is scheduled to perform the next act. The real-time information on the crowdedness as shown in FIG. 8B is a good example of appropriate advice regarding the next act.

The action schedule support service system 100 provides the user 20 with appropriate advice regarding the next act at an appropriate timing, so that the user 20 can proceed with the action schedule smoothly and pleasantly and as a result, is satisfied. Especially when the user 20 is to perform an act of which the user has no experience (for example, when the user 20 goes to a location which is not known to the user 20), the effect of providing appropriate advice regarding the next act at an appropriate timing is significant.

The screen 811 indicates that the user 20 would have to wait for 30 minutes in order to have dinner at the restaurant. An area 812 indicates that in the case where the user 20 gives up using the restaurant and desires to search for another restaurant (store) that the user 20 can use, the user 20 may push button "2" (see FIG. 1; not shown in FIG. 8B) provided in the mobile terminal device 21. In response to the user 20 pushing button "2", the mobile terminal device 21 may request the service center 1 to search for another restaurant. The service center 1 accesses the restaurant information database 7b (FIG. 2) so as to search for another restaurant. When a desirable restaurant is found by this search, the location where the user 20 is to perform the next act, "dinner", is changed to that desirable restaurant.

In this manner, the user 20 can easily change the next act (i.e., change the action schedule). Therefore, for example, even when the user 20 has not made any restaurant reservation when going out on a date, an unfavorable situation that the date is spoiled as a result of waiting for a long time due to the crowdedness of the restaurant can be avoided. It is preferable that the information regarding the next act after the change (for example, information regarding the map of the area including the location where the user 20 is to perform the next act after the change, and information regarding the menu of dishes of the restaurant after the change) is also transmitted to the mobile terminal device 21.

When it is informed to the service center 1 that the user 20 has already made a reservation at a restaurant (for example, when the service center 1 can learn that the user 20 has already made a reservation at a restaurant by referring to the action schedule), the service center 1 does not have to transmit the information representing the crowdedness of the restaurant to the mobile terminal device 21. The situation in which the next act is changed is not limited to when the location where the user 20 is scheduled to perform the next act is crowded (when the user 20 would have to wait), but may be any point in any case.

In order to provide the latest menu and crowdedness information to the user 20, it is preferable to update the content of the database 7 shown in FIG. 2 at an appropriate timing. The content of the database 7 may be updated by the administrator of the service center 1 or the administrator (for example, the manager) of the corresponding commercial establishment 31 (FIG. 1). The updating of the database 7 by the commercial establishment 31 can provide an advantage of increasing the number of visitors to the commercial establishment 31 by providing the user 20 with the latest information.

The overall structure of the action schedule support service system 100 is not limited to the structure shown in FIG. 1. For example, the service center 1 does not have to include the storage section 5 for storing the action schedule. When the service center 1 does not include the storage section 5, the action schedule may be stored in the PC 61 in the house 60 of the user 20. The service center 1 may access the action schedule stored in the PC 61 via the network 40.

The starting point and termination point of the action schedule may be arbitrarily set. The starting point and termination point of the action schedule may be, for example, a central station of a famous tourist city (for example, Kyoto or Nara, Japan). A tourist may determine the action schedule after visiting the station. When the action schedule support service is used in this form, a computer for registering the action schedule with the service center 1 is preferably provided in the station, instead of the PC 61 shown in FIG. 1. Alternatively, the user 20 may register the action schedule with the service center 1 using the mobile terminal device 21. The form of using the action schedule support service in which the tourist determines the action schedule after visiting a station functioning as the center of sightseeing is especially preferable to a tourist who is not familiar with the city (for example, a visitor from a foreign country). The reason is that the tourist can select an appropriate action schedule from template action schedules in accordance with the situation of the time of visit to the station (for example, the weather or the duration of stay).

The user 20 may register the action schedule with the service center 1 via a web site in the Internet. Such a web site can carry template action schedules prepared in advance by the service center 1 and provide service as a travel agent. The user 20 can access such a web site so as to determine the action schedule in a form reflecting the desires of the user 20. The user 20 can access such a web site from anywhere in the world via the Internet, and therefore can determine an action schedule at a destination of the trip (an action schedule having the destination of the trip as a staring point and a termination point) and register the action schedule with the service center 1, before departure.

As described above, the user 20 can alter a template action schedule so as to create a desired action schedule before registering the action schedule with the service center 1. Alternatively, the user 20 may create a desired action schedule irrespective of the template action schedules. Such an action schedule created by the user 20 may be added to the template action schedule database 7a (FIG. 2) of the service center 1 as a new template action schedule. An action schedule after the change made by the user 20 because of the crowdedness that the user 20 encountered while acting in compliance with the action schedule may be added to the template action schedule database 7a of the service center 1 as a new template action schedule. By updating the template action schedule database 7a in this manner, the alternative action schedules available to the user 20 are increased.

In the above-described example, a plurality of acts are each accompanied by a purchase and sale transaction with a commercial establishment. The present invention is not limited to this. In the case where an act is not accompanied by a purchase and sale transaction, the settlement information 121 is not transmitted to the service center 1. Even in this case, when information specifying one of the plurality of acts included in the action schedule (execution information) is transmitted to the service center 1, the service center 1 can compare the act of the user 20 with the action schedule. Such a transmission of the execution information from the mobile terminal device 21 to the service center 1 may be performed in response to the user 20 manually triggering the mobile terminal device 21 (for example, pushing a predetermined button provided in the mobile terminal device 21). The user 20 may trigger the mobile terminal device 21 before starting the act (for example, when the act is "entering an attraction of an amusement park", before entering the facilities of the attraction) or after the act (for example, after exiting the facilities of the attraction). Alternatively, the user 20 may trigger the mobile terminal device 21 during the act (for example, while being in the facilities of the attraction).

When the user 20 triggers the mobile terminal device 21 before starting an act, the execution information transmitted in response to the triggering represents an act that the user 20 is about to start. When the user 20 triggers the mobile terminal device 21 after an act, the execution information represents an act that the user 20 has recently finished. When the user 20 triggers the mobile terminal device 21 during an act, the execution information represents an act that the user 20 is currently performing.

The execution information may have any data structure as long as the service center 1 can specify one of the plurality of acts included in the action schedule. For example, the execution information may include only an act number shown in the "act number" field 511 (FIG. 5) of the action schedule 510. The service center 1 can specify an act corresponding to the record having the act number, among the plurality of acts, based on the act number.

The action schedule support service of the present invention is usable by the user 20 wishing to efficiently try a plurality of attractions in an amusement park (for example, Universal Studios Japan®). In this case, an action schedule can be prepared with entrance of one attraction of the amusement park being considered as one act, and the entrance and the exit of the amusement park being respectively considered as a starting point and a termination point of the action schedule. The user 20 can efficiently move from one attraction to another attraction based on information regarding the map of an area including each attraction and can also easily change the action schedule based on information regarding the crowdedness of each attraction. Thus, when the user 20 goes to an amusement park with the user's family, an unfavorable situation can be avoided that a course for trying many favorite attractions prepared in advance cannot be followed due to the unfamiliarity with the ways in the amusement park and the crowdedness.

The action schedule support service of the present invention is also usable by the user 20 moving by an automobile. In this case, an action schedule can be prepared with, for example, use of a toll road or use a toll parking lot being considered as one act.

The structure of the database 7 is not limited to the structure shown in FIG. 2. The service center 1 can acquire restaurant information, map information, movie theater information, and amusement park information by accessing any computer connected to the service center 1 via the network 40, instead of accessing the database 7 having the structure shown in FIG. 2. The types of information acquired by the service center 1 are not limited to those mentioned above.

As described above, the mobile terminal device 21 of the user 20 transmits execution information (for example, the settlement information 121 shown in FIG. 1) to the service center 1. Based on the execution information, the service center 1 may execute the processing of creating an action record of the user 20. The action record may be created by, for example, arranging pieces of execution information respectively representing a plurality of acts in the order in which the service center 1 received the pieces of execution information. By providing the user 20 with such an action record (for example, by transmitting an action record to the PC 61 of the user 20 in response to the request from the user 20), the action schedule support service system 100 can allow the user 20 to use the action record as a journal. The user 20 may keep the action record with photographs as a record of the trip. Provision of the action record to the user 20 may or may not be free of charge.

FIG. 6B shows an exemplary structure of data representing an action record. The example shown in FIG. 6B represents an action record of the user 20 acting in compliance with the action schedule shown in FIG. 5. The action record is stored in, for example, the storage section 5 of the service center 1.

When the settlement information 121 is transmitted to the service center 1, the service center 1 may execute the processing of creating a payment record accompanying the act of the user 20 based on the settlement information 121. The payment record may be created by, for example, arranging pieces of settlement information 121 respectively representing a plurality of acts classified based on the "content" field 615 (FIG. 6A). By providing such a payment record to the user 20 (for example, by transmitting a payment record to the PC 61 of the user 20), the action schedule support service system 100 can allow the user 20 to use the payment record as an account book. The service center 1 may execute the processing of creating an action record including a payment record. When the action record including the payment record is provided to the user 20, the user 20 can look back at the action schedule by referring to the action record. When the action schedule is of a pleasant trip, the user 20 can remember the trip in detail together with the payment record of the trip.

According to the present invention, a processing apparatus receives execution information from a terminal device of a user. The execution information specifies one of a plurality of acts included in an action schedule. The processing apparatus specifies an act, scheduled to be performed by the user after the specified act, as a subsequent act, and transmits related information regarding the subsequent act to the user. Thus, the user can be provided with information regarding the act to perform subsequently at an appropriate timing.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for providing a user of a mobile terminal device with information using the mobile terminal device and a processing apparatus, wherein an action schedule representing an order of a plurality acts to be performed by the user is predetermined and stored in the processing apparatus, the method comprising the steps of:

the mobile terminal device generating, and transmitting to the processing apparatus, execution information which specifies one of the plurality of acts performed by the user, wherein the execution information is information regarding a settlement of a purchase and sale transaction accompanied by the act specified by the execution information;

the processing apparatus specifying a subsequent act which is scheduled to be performed by the user after the act specified by the execution information;

the processing apparatus acquiring related information relevant to the subsequent act; and the processing apparatus transmitting the related information to the mobile terminal device such that the user is provided with the related information relevant to the subsequent act wherein the mobile terminal device includes a settlement function of communicating with a settlement apparatus in a commercial establishment so as to cashlessly perform the settlement of the purchase and sale transaction done by the user of the mobile terminal device, and the mobile terminal uses the communicating results to generate the execution information.

2. A method according to claim 1, wherein the related information includes at least one of information regarding a map of an area including a location where the user is scheduled to perform the subsequent act, information representing a crowdedness of the location, information regarding a list of services available to the user in a commercial establishment where the user is scheduled to perform the subsequent act, and information regarding business hours of the commercial establishment.

3. A method according to claim 1, wherein the plurality of acts include at least one of moving by train, seeing a movie, having dinner at a restaurant, entering an amusement park, and entering an attraction in the amusement park.

4. A method according to claim 1, wherein the processing apparatus includes a storage section for storing the action schedule.

5. A method according to claim 1, further comprising the step of the processing apparatus creating an action record of the user based on the execution information.

6. A method according to claim 1, further comprising the step of the processing apparatus creating a payment record accompanying the acts of the user based on the information regarding the settlement of the purchase and sale transaction.

7. A method according to claim 1, further comprising the step of the processing apparatus creating an action record including a payment record accompanying the acts of the user based on the information regarding the settlement of the purchase and sale transaction.

8. An action schedule support service system comprising a processing apparatus and a mobile terminal device, the processing apparatus connected to the mobile terminal device via a network, the processing apparatus further comprising:

a storage section for storing an action schedule representing an order of a plurality acts to be performed by a user of the mobile terminal device;

a network communication section for communicating with the mobile terminal device via the network; and a processing section, wherein the mobile terminal device includes a settlement function of communicating with a settlement apparatus in a commercial establishment so as to cashlessly perform a settlement of a purchase and sale transaction done by the user of the mobile terminal device;

the mobile terminal device uses the communicating results to generate and transmit to the network communication section, execution information which specifies one of the plurality of acts performed by the user, wherein the execution information is information regarding the settlement of the purchase and sale transaction accompanied by the act specified by the execution information;

the processing section specifies, a subsequent act which is scheduled to be performed by the user after the act specified by the execution information, and acquires related information relevant to the subsequent act, and the network communication section transmits the related information to the mobile terminal device.

* * * * *